United States Patent [19]
Dodson et al.

[11] 3,805,586
[45] Apr. 23, 1974

[54] ABRASION TEST MACHINE
[75] Inventors: Michael Dodson, Fullerton; Philip Terry Gibson, Los Alamitos, both of Calif.
[73] Assignee: The United States of America as represented by the Secretary of the Navy, Washington, D.C.
[22] Filed: Oct. 24, 1972
[21] Appl. No.: 300,015

[52] U.S. Cl. ............................................ 73/7, 73/11
[51] Int. Cl. .............................................. G01n 3/56
[58] Field of Search ............................... 73/7–9, 11, 73/10, 12

[56] References Cited
UNITED STATES PATENTS
3,386,278  6/1968  Barthelemy ............................ 73/11
3,121,320  2/1964  Bauer ..................................... 73/7
2,032,202  2/1936  Dennis .................................... 73/7

Primary Examiner—Richard C. Queisser
Assistant Examiner—Daniel M. Yasich
Attorney, Agent, or Firm—R. S. Sciascia; R. J. Miller

[57] ABSTRACT

The invention discloses an improved abrasion test machine that includes means for simulating load conditions to test a wire specimen under simulated conditions of aircraft carrier landing. This includes means for testing a wire specimen and applying a tension and torque load simultaneously.

2 Claims, 4 Drawing Figures

ABRASION TEST MACHINE

The invention described herein may be manufactured and used by or for the Government of the United States of America for governmental purposes without the payment of any royalties thereon or therefor.

The Navy has long been involved in the problem of arresting the flight of an aircraft on landing when the landing field, air strip or aircraft carrier is of a limited length and auxiliary arresting techniques must be used. All of these auxiliary devices external to the aircraft tend to incorporate devices that must withstand extremely high forces. For example, a 60,000 pound aircraft coming in to land on an aircraft carrier deck at a relative speed of 100 knots will engage it's tail hook with an arresting cable and the cable must absorb this extremely high tension load in a very short time. A great deal of pilot safety, crew safety and property safety is involved in this matter and it is necessary that an arresting cable be designed which will on the one hand not break under load and on the other hand not be so over designed that the expense involved is prohibitive. Therefore, it is necessary to have means of testing these cable by simulating the actual physical conditions encountered in this kind of arresting gear.

It is therefore an object of this invention to provide an improved testing device.

It is yet a further object of this invention to provide an improved testing device capable of simulating the load conditions on arresting cable used on an aircraft carrier.

It is still a further objective of this invention to provide an improved abrasion test machine for testing single wire specimens under conditions similar to be encountered under normal operating conditions comprising; means for holding a specimen to be tested, means for generating tensional force to the specimen to be tested, means for generating torsional force to the specimen to be tested, means for generating a contact force to the specimen to be tested, and control means for controlling the contact force means, the tensional force generating means, and torque means to apply all of the forces to a specimen being tested at the same time.

Yet a further objective of this invention is to provide an improved abrasion test machine for testing arresting cable usable in aircraft carrier type landing of planes utilizing tail hooks consisting of a specimen holder having a V-shaped groove consisting of three portions 92, 93 and 94 at slight angles to each other, a first specimen grip means on one side of the specimen holder and a second grip means on the other side of the specimen holder adapted to provide tensional forces to a specimen to be tested that is held in the three portions of the groove, a plate member simulating tail hook surface in contact with the specimen in said specimen holder adapted to move in a plane tangent to the specimen to be tested, a pressure plate assembly having roller members coupled to a hydraulic cylinder for applying a pressure to the simulated hook surface plate, the simulated hook surface member and said pressure plate member coupled thru linking means to be actuated in the plane of the tangential contact with the specimen by a cam member actuated by a drop weight of predetermined mass whose impact is varied by the height of drop.

Other objects, advantages and novel features of the invention will become apparent from the following detailed description of the invention when considered in conjunction with the accompanying drawing wherein.

Figure 1:
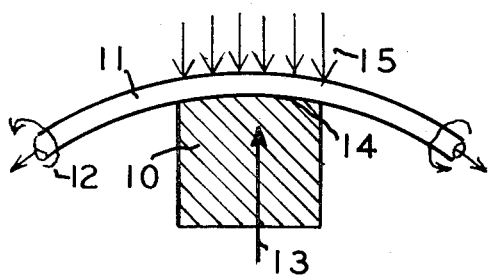
FIG. 1 shows the general forces and conditions existing in a deck-pendant wire.

In FIG. 1, an arresting hook 10 is shown contacting a single wire 11 which represents one outer wire of a deck pendant wire. In addition to tensional force on the wire, torsional force exists as shown by arrow 12 resulting from bending of the deck pendant cable over the arresting hook. Contact force 13 is applied by the arresting hook as it comes in contact against wire 11 along contact surface 14 between wire 11 and hook 10. It should be noted that compressional force will develop along the contact surface 14. Arrows 15 represent forces in the wire 11 resulting from the force generated by tail hook 10.

Figure 3:
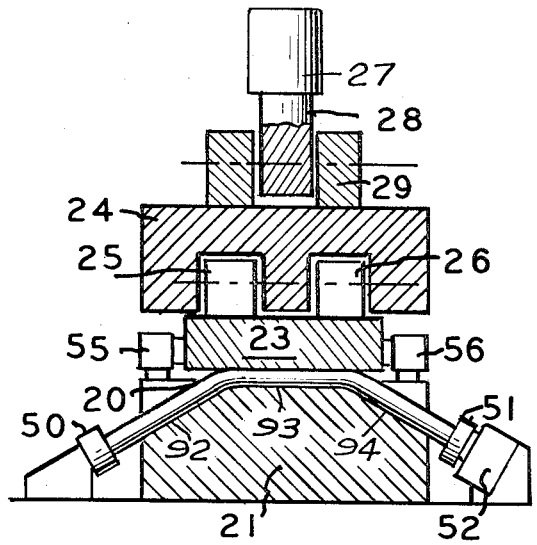
FIG. 3 is an end view of a portion of the machine showing in further detail the test specimen and contacting force applying members along line 3—3 in FIG. 2.
Figure 2:
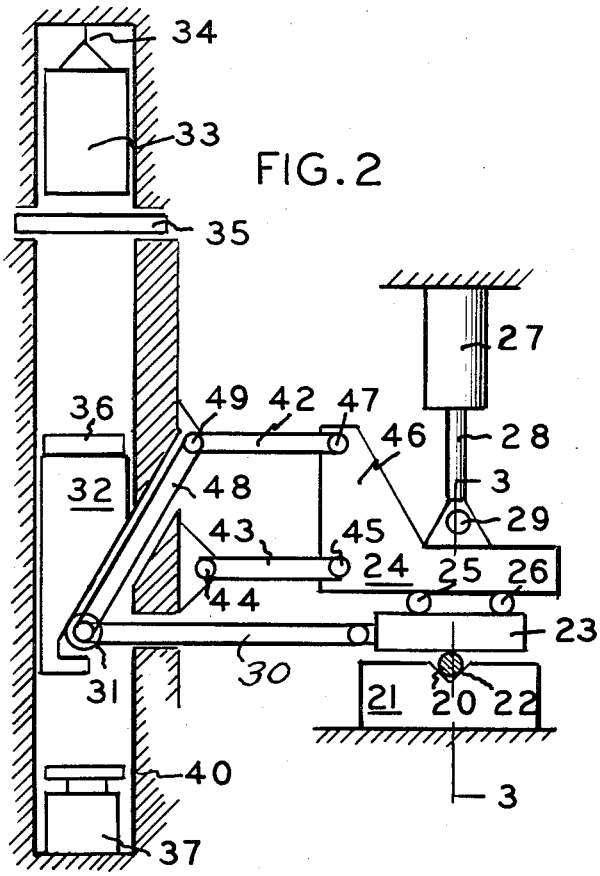
FIG. 2 shows the schematic design of the machine for testing a wire specimen.

FIG. 2 is a schematic drawing of a machine incorporating elements for producing within a test specimen 20, the necessary simulated forces for evaluating a cable wire under load conditions similar to actual practice. A grooved support member 21 has a groove 22 wherein support member receives test specimen 20. A simulated hook surface plate 23 contacts specimen 20 along a portion of the specimen as shown in FIG. 3. A pressure plate 24 having a pair of rollers 25, 26 in contact with plate 23 and is connected to hydraulic cylinder 27 for applying pressure thru piston rod 28 and clevis 29 to pressure plate 24. The simulated hook surface 23 is coupled thru linkage 30 to Cam follower mechanism 31 that in turn is actuated by wedge shaped cam 32. Force is exerted on Cam follower mechanism 31 and wedge shaped cam 32 by a drop weight 33 which is shown in the figure in the raised position held by release mechanism 34. For safety purposes a safety bar 35 is provided for protection of personnel operating this machine. Shock controlling material 36 on the top portion of cam 32 provides additional control in the application of forces to specimen 20. A shock absorber 37 is provided to arrest the drop weight 33 and cam 32 after each test.

Linkage is provided between pressure plate 24 and housing 40 to keep the pressure plate horizontal when traveling with regard to the plate member 23 simulating the hook surface. A first bar 42 and a second bar 43 are provided, wherein bar 43 is coupled to housing 40 thru pin 44 and to plate 24 thru pin 45. An extension of the pressure plate 24 designated as 46 is connected to rod 42 thru pin 47. Rod 42 is coupled to housing 40 thru pin 49. One end of rod 48 also is attached to housing 40 thru pin 49 and its other end is connected to cam follower mechanism 31.

FIG. 3 is a cross sectional view of a portion of FIG. 2 along line 3-3 showing a little more detail of the specimen as it is tested. Block 21 is shown retaining specimen 20 in groove 22. The groove includes a first central portion to hold a portion of the specimen in a horizontal position with respect to plate 23 and end portions at an angle to the central portion. Specimen wire 20 is held in the groove 22 by specimen grip 50 and specimen grip 51 which is coupled to a tension cylinder 52. A mechanism is provided on hydraulic cylinder 52 to allow the piston rod of cylinder 52 and the specimen grip 51 to be rotated and held in position to provide the desired tensional force to specimen 20. The simulated hook surface 23 is shown having guide rollers 55 and 56 for retaining it in proper alignment. Pressure rollers 25 and 26 mounted in pressure plate assembly 24 coupled thru the assembly 29 to the piston rod 28 of the hydraulic cylinder 27.

Figure 4:
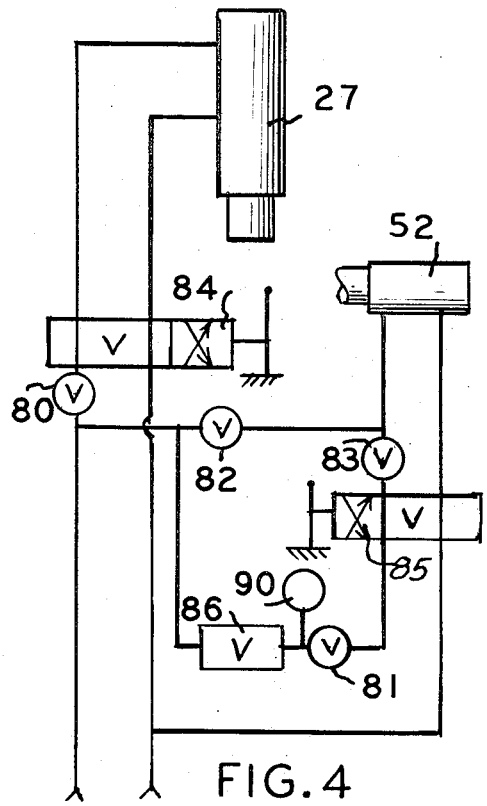
FIG. 4 is a schematic layout of the control system.

FIG. 4 shows a hydraulic schematic for abrasion test machine and includes a plurality of valves, 80, 81, 82 and 83, a four way compression valve 84 and a four way tension valve 85. In addition, a pressure reducing valve 86 for controlling the high pressure to tension cylinder 52 and compression cylinder 27. A pressure gage 90 is provided for the purpose of setting the conditions existing in the system.

The sequence of operation of the machine is as follows:

Valve 82 is closed,

Valve 83 is open.

Valves 80 and 81 are adjusted for the desired rate of tension and compression cylinder operation.

Compression valve 84 is in the extended or fully out position.

Drop weight 33 is lifted.

Tension in wire specimen 20 is set by fully extending valve 85.

Hook surface plate 23 is moved in the leftward position until the cam follower 31 engages wedge shaped cam 32.

The weight 33 is raised until it is a desired height.

Weight 33 is then released and contacts material 36 and drives cam 32 in a downward direction.

Rod 30 moves in a horizontal direction to the right as shown.

Hook surface plate 23 then travels horizontally.

At the same time valves 84 and 85 are actuated and compression is applied by cylinder 27 thru pressure plate 24 and rollers 25 and 26 to the topside of hook surface plate 23 and the specimen is placed under tension by tension cylinder 52.

Thus, specimen 20 is subject to compressional force tensional force and torsional force it's capabilities evaluated.

Obviously many modifications and variations of the present invention are possible in the light of the above teachings. It is therefore to be understood that within the scope of the appended claims the invention may be practiced otherwise than as specifically described

I claim:

1. An improved abrasion test machine comprising:
    a. a specimen holding member having a specimen groove and having a first central disposed portion designed to hold a wire specimen to be tested in an exposed position and second and third portions at an angle with said first portion;
    b. first specimen grip means adapted to hold a first end of a specimen to be tested;
    c. a second specimen grip means capable of holding the second end of a specimen to be tested, coupled to a tensioning cylinder said specimen holder and specimen grip means capable of applying a tensional force and torsional force to a specimen to be tested held in said groove;
    d. a plate member contacting a wire specimen member to be tested in said exposed position along a contact line;
    e. a pressure member in contact with the said plate member coupled to a contact pressure cylinder for applying pressure to said wire specimen to be tested in contact with said plate member;
    f. a cam follower mechanism;
    g. a linkage coupled to said plate member and coupled to said cam follower mechanism adapted to be actuated by said cam follower mechanism to move said plate member in the plane including said contact line;
    h. a drop weight actuating means positioned to allow a weight to be dropped on said cam follower mechanism for moving said cam mechanism to actuate said linkage and cause said plate member to move in contact with said wire specimen to be tested; and
    i. control means coupled to said tensioning means, said contact pressure cylinder, and said drop weight for actuating said machine to apply tensioning, contact and torque forces to a wire specimen to be tested.

2. An improved abrasion test machine for testing specimens under impact conditions similar to those encountered under normal operating conditions comprising:
    a. means for holding a wire specimen to be tested;
    b. means for applying a tension force including a first wire specimen holding means and a second wire specimen holding means to hold a wire specimen in the specimen holding means, the second specimen grip coupled to a tensional cylinder for applying tensional forces to a specimen;
    c. means for generating a torsion force including means for rotating the tension cylinder to develop desired torque in a specimen;
    d. means for generating a sudden contact force including a plate in contact with a specimen to be tested which is operable under load conditions to apply a contact force to a specimen to be tested;
    e. control means including means for adjustment of the contact force means, torque means, and tension force means, to provide various loads to simulate impact conditions on a wire specimen to be tested, said control means actuates the tension force generating means, torque means and contact force means concurrently to a wire specimen.

* * * * *